US012659714B2

(12) United States Patent
Hong

(10) Patent No.: US 12,659,714 B2
(45) Date of Patent: Jun. 16, 2026

(54) METHOD AND APPARATUS FOR INFORMATION TRANSMISSION

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 461 days.

(21) Appl. No.: 18/039,821

(22) PCT Filed: Dec. 2, 2020

(86) PCT No.: PCT/CN2020/133453
§ 371 (c)(1),
(2) Date: Jun. 1, 2023

(87) PCT Pub. No.: WO2022/116063
PCT Pub. Date: Jun. 9, 2022

(65) Prior Publication Data
US 2024/0007841 A1 Jan. 4, 2024

(51) Int. Cl.
*H04W 8/18* (2009.01)
*H04W 68/02* (2009.01)

(52) U.S. Cl.
CPC ............. *H04W 8/18* (2013.01); *H04W 68/02* (2013.01)

(58) Field of Classification Search
CPC ................................. H04W 8/18; H04W 68/02
USPC ....................................................... 455/418
See application file for complete search history.

(56) References Cited

U.S. PATENT DOCUMENTS

| | | |
|---|---|---|
| 2012/0172029 A1 | 7/2012 | Lai et al. |
| 2016/0100380 A1 | 4/2016 | Jha et al. |

FOREIGN PATENT DOCUMENTS

| | | | |
|---|---|---|---|
| CN | 102546918 A | 7/2012 | |
| CN | 110572876 A | 12/2019 | |
| CN | 111294789 A * | 6/2020 | ............ H04W 68/02 |
| WO | 2020/223978 A1 | 11/2020 | |

OTHER PUBLICATIONS

ISA State Intellectual Property Office of the People's Republic of China, International Search Report Issued in Application No. PCT/CN2020/133453, Sep. 2, 2021, WIPO, 4 pages.
(Continued)

*Primary Examiner* — Jirapon Tulop
(74) *Attorney, Agent, or Firm* — Volpe Koenig

(57) ABSTRACT

A method for information transmission, comprising: determining an occurrence of a paging collision; sending, by a target SIM card of a multi-card terminal, target indication information configured to indicate the occurrence of the paging collision to a target base station, wherein the target base station is a base station where the target SIM card resides; receiving, by the target SIM card of the multi-card terminal, target configuration information from the target base station, where the target configuration information is new configuration information related to a paging process of the target SIM card; and paging signaling is monitored and received by the target SIM card according to the target configuration information.

18 Claims, 10 Drawing Sheets

(56)              References Cited

OTHER PUBLICATIONS

Ericsson "Paging collision avoidance""3GPP TSG-RAN WG2 #111e Tdoc R2-2007603 Electronic meeting, Aug. 17-28, 2020" Aug. 28, 2020,4 pages.

Intel et al., "Solution for Paging Reception with PO collision avoidance.""SA WG2 Meeting #S2-136 S2-1911942" Nov. 15, 2019,4 pages.

\* cited by examiner

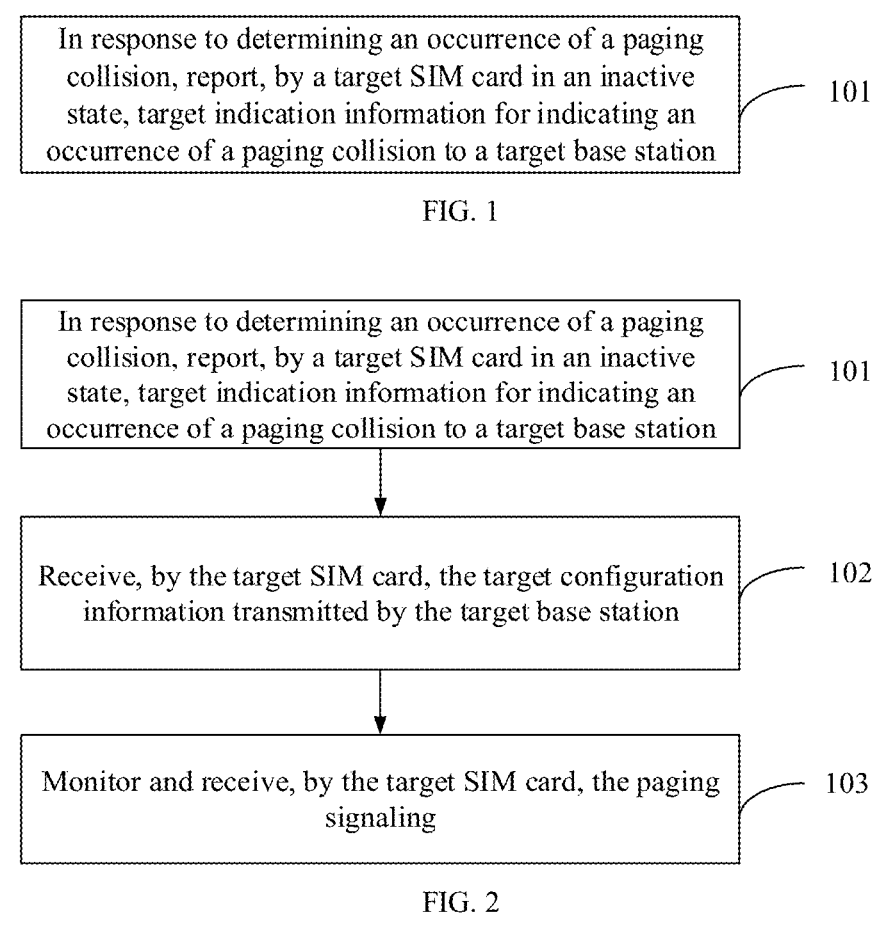

In response to determining an occurrence of a paging collision, report, by a target SIM card in an inactive state, target indication information for indicating an occurrence of a paging collision to a target base station — 101

FIG. 1

In response to determining an occurrence of a paging collision, report, by a target SIM card in an inactive state, target indication information for indicating an occurrence of a paging collision to a target base station — 101

Receive, by the target SIM card, the target configuration information transmitted by the target base station — 102

Monitor and receive, by the target SIM card, the paging signaling — 103

FIG. 2

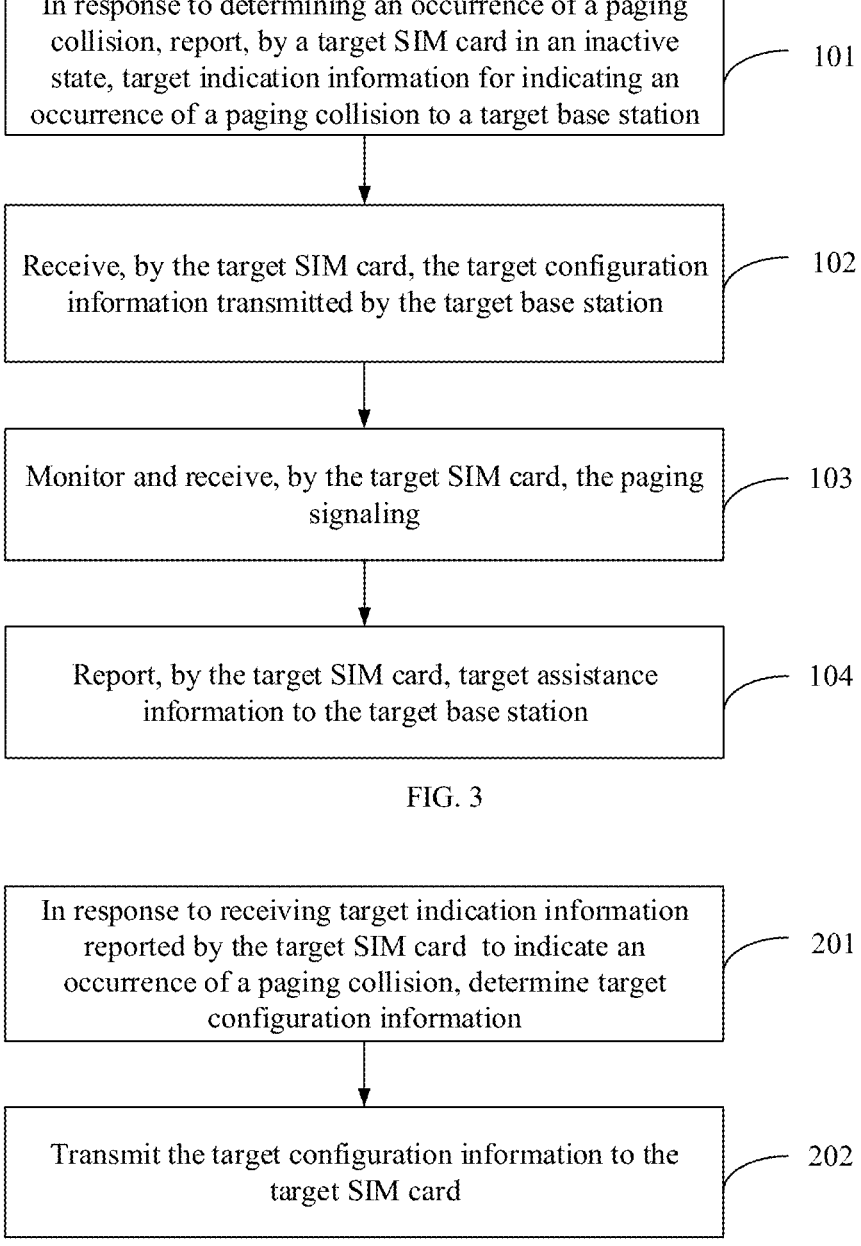

In response to determining an occurrence of a paging collision, report, by a target SIM card in an inactive state, target indication information for indicating an occurrence of a paging collision to a target base station — 101

Receive, by the target SIM card, the target configuration information transmitted by the target base station — 102

Monitor and receive, by the target SIM card, the paging signaling — 103

Report, by the target SIM card, target assistance information to the target base station — 104

FIG. 3

In response to receiving target indication information reported by the target SIM card to indicate an occurrence of a paging collision, determine target configuration information — 201

Transmit the target configuration information to the target SIM card — 202

FIG. 4

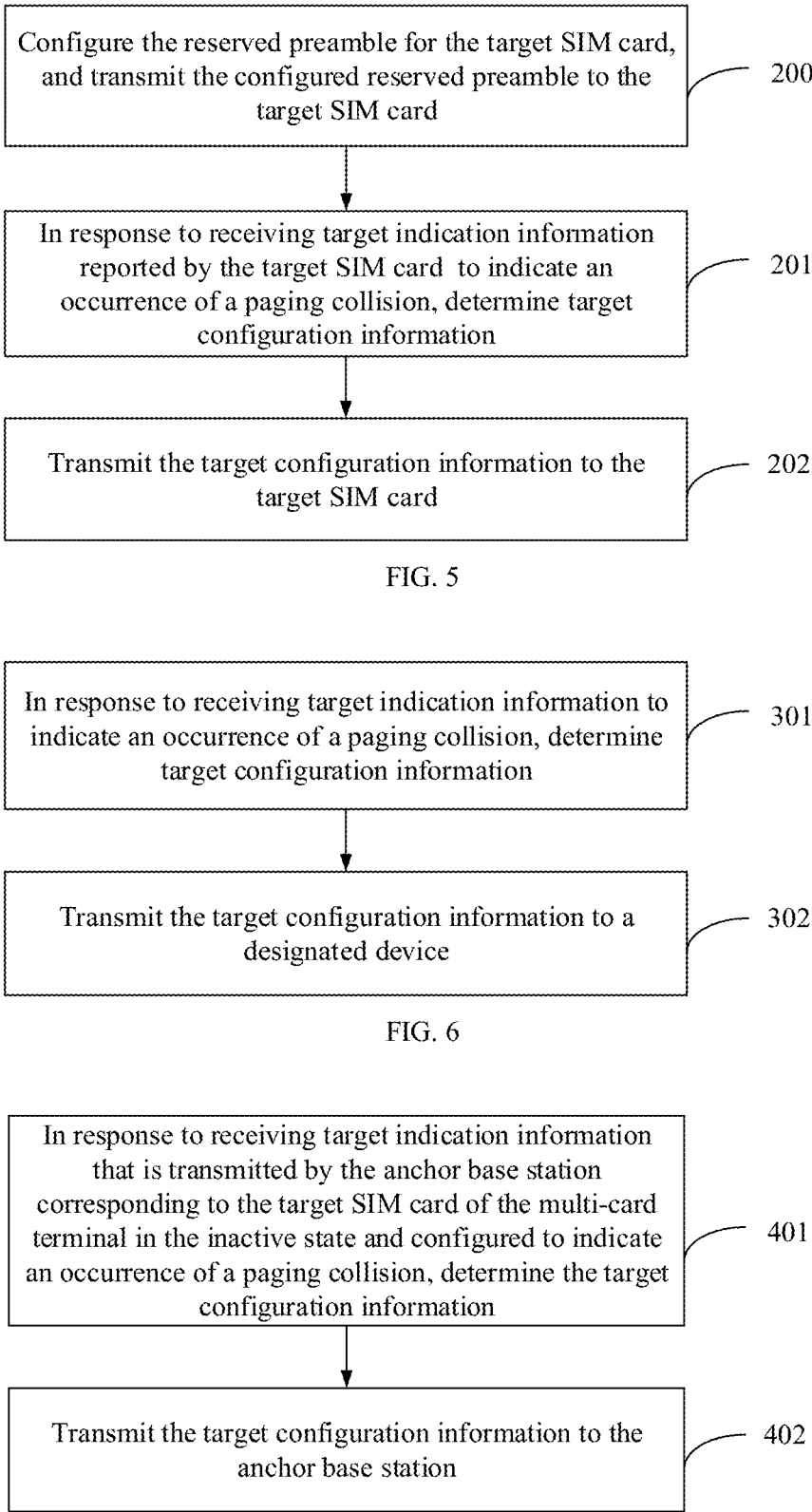

Configure the reserved preamble for the target SIM card, and transmit the configured reserved preamble to the target SIM card — 200

In response to receiving target indication information reported by the target SIM card to indicate an occurrence of a paging collision, determine target configuration information — 201

Transmit the target configuration information to the target SIM card — 202

FIG. 5

In response to receiving target indication information to indicate an occurrence of a paging collision, determine target configuration information — 301

Transmit the target configuration information to a designated device — 302

FIG. 6

In response to receiving target indication information that is transmitted by the anchor base station corresponding to the target SIM card of the multi-card terminal in the inactive state and configured to indicate an occurrence of a paging collision, determine the target configuration information — 401

Transmit the target configuration information to the anchor base station — 402

METHOD AND APPARATUS FOR INFORMATION TRANSMISSION

CROSS REFERENCE TO RELATED APPLICATION

This application is a National Stage of International Application No. PCT/CN2020/133453, filed on Dec. 2, 2020, the contents of all of which are incorporated herein by reference in their entirety.

BACKGROUND

With the development of wireless communication technology, there are more and more multi-card terminals.

SUMMARY

The present disclosure relates to the technical field of communication, in particular to methods and apparatuses for information transmission.

According to the first aspect of the embodiments of the present disclosure, a method for information transmission performed by a multi-card terminal configured with a target SIM card in an inactive state is provided, and includes: determining an occurrence of a paging collision; sending, via the target SIM card, target indication information configured to indicate the occurrence of the paging collision to a target base station, wherein the target base station is a base station where the target SIM card resides.

According to the second aspect of the embodiments of the present disclosure, a method for information transmission is provided, performed by a base station, and includes: receiving target indication information configured to indicate an occurrence of a paging collision associated with a target SIM card; determining target configuration information, wherein the target configuration information is new configuration information related to a paging process of the target SIM card of a multi-card terminal in an inactive state; and transmitting the target configuration information.

According to the third aspect of the embodiments of the present disclosure, a method for information transmission is provided, performed by a core network device, and includes: receiving target indication information that is configured to indicate an occurrence of a paging collision and transmitted by an anchor base station corresponding to a target SIM card of a multi-card terminal in an inactive state; determining target configuration information, where the target configuration information is new configuration information related to a paging process of the target SIM card; and transmitting the target configuration information to the anchor base station.

According to the fourth aspect of the embodiments of the present disclosure, an apparatus for information transmission is provided, and includes: a processor; and a memory for storing instructions executable by the processor; where the processor is configured to perform the method for information transmission of the first aspect above.

According to the fifth aspect of the embodiments of the present disclosure, an apparatus for information transmission is provided, and includes: a processor; and a memory for storing instructions executable by the processor; where the processor is configured to perform the method for information transmission of the second aspect above.

According to the sixth aspect of the embodiments of the present disclosure, an apparatus for information transmission is provided, and includes: a processor; and a memory for storing instructions executable by the processor; where the processor is configured to perform the method for information transmission of the third aspect above.

It is to be understood that the above general descriptions and the below detailed descriptions are merely exemplary and explanatory, and are not intended to limit the present disclosure.

BRIEF DESCRIPTION OF DRAWINGS

The accompanying drawings herein, which are incorporated in and constitute a part of the present description, illustrate examples consistent with the present disclosure and serve to explain the principles of the present disclosure together with the description.

FIG. 1 is a flowchart of a method for information transmission according to an embodiment.

FIG. 2 is a flowchart of a method for information transmission according to an embodiment.

FIG. 3 is a flowchart of a method for information transmission according to an embodiment.

FIG. 4 is a flowchart of a method for information transmission according to an embodiment.

FIG. 5 is a flowchart of a method for information transmission according to an embodiment.

FIG. 6 is a flowchart of a method for information transmission according to an embodiment.

FIG. 7 is a flowchart of a method for information transmission according to an embodiment.

DETAILED DESCRIPTION

Figure 8A:
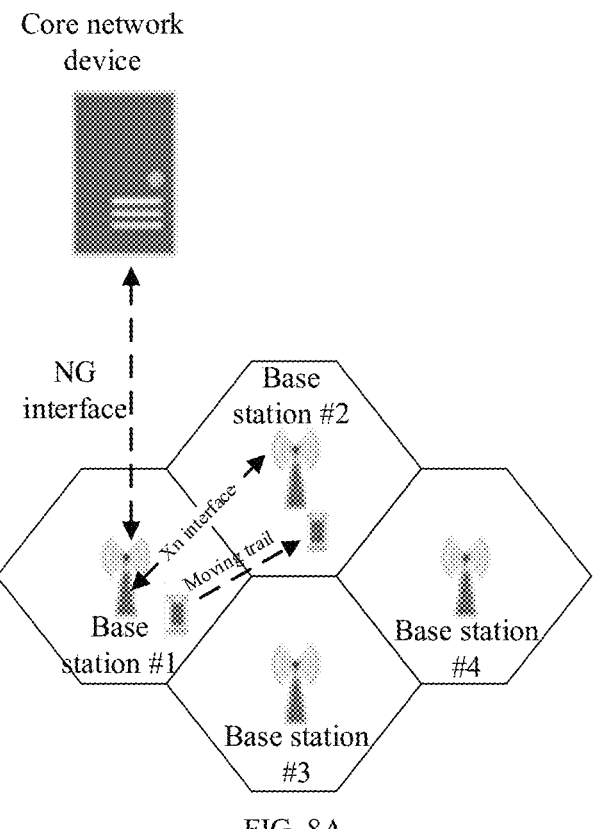
FIG. 8A is a schematic diagram of an information transmission scenario according to an embodiment.

Embodiments will be described in detail here, with the examples thereof expressed in the drawings. When the following descriptions involve the drawings, like numerals in different drawings represent like or similar elements unless stated otherwise. Implementations described in the following embodiments do not represent all implementations consistent with the present disclosure. On the contrary, they are examples of an apparatus and a method consistent with some aspects of the present disclosure described in detail in the appended claims.

The term used in the present disclosure is for the purpose of describing particular embodiments only and is not intended to limit the present disclosure. As used in the present disclosure and the appended claims, the singular forms "a", "an", and "the" are intended to include the plural forms as well, unless the context clearly indicates otherwise. It should further be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred to as second information; and similarly, the second information may also be referred to as the first information. Depending on the context, the word "if" as used herein can be interpreted as "upon", "when", or "in response to determining".

The processing methods for multi-card terminals are mainly implemented by each terminal manufacturer, which leads to many different terminal behaviours and processing methods, such as dual-card single-standby, dual-card dual-standby single-pass, dual-card dual-standby dual-pass, etc. However, there are some problems, for example, the paging timing of different cards of the same terminal may collide, causing the multi-card terminal to fail to receive or miss paging signalling, thereby affecting services.

Technical solutions for transmitting information provided in the present disclosure can be targeted at the multi-card terminal, including multiple SIM (Subscriber Identity Module) cards, where a target SIM card of the multi-card terminal is in the INACTIVE state.

In 5G (5th-Generation, fifth-generation mobile communication technology) NR (New Radio), a new RRC (Radio Resource Control) state, namely RRC_INACTIVE state, is introduced. When a terminal is in RRC_INACTIVE state, the NAS (Non Access Layer) of the terminal remains connected, that is, the connection between the terminal and the core network remains. But the air interface connection of the terminal is disconnected. The base station side retains the context information of the terminal and retains the NG interface connection between the terminal and the core network, where the NG interface is the interface between the wireless access network and the 5G core network.

A terminal in an inactive state can move within a region configured by the base station without notifying the network, so as to save signalling overhead. When a terminal enters an inactive state, the last service base station (i.e. the anchor base station corresponding to the terminal) stores the context of the terminal and maintains a connection to the NG interface of the service core network, and the AS (Access Stratum, an access layer) of the terminal also stores the corresponding context information, including the bearer, the identification of the inactive state, and the home area. In this way, the base station can page the terminal in the inactive state through the wireless access network paging mechanism within the configured region, and the terminal can quickly resume data transmission based on the context information stored on the terminal side and the base station side, to achieve low-latency transmission.

The method for information transmission provided in the present disclosure is introduced first from the multi-card terminal side.

A method for information transmission is provided in an embodiment of the present disclosure, as shown in FIG. 1. FIG. 1 is a flowchart of a method for information transmission according to an embodiment. The method can be performed by a multi-card terminal. The method can include the following step 101.

In step 101, in response to determining an occurrence of a paging collision, target indication information for indicating an occurrence of a paging collision is reported by a target SIM card in an inactive state to a target base station.

In the embodiments of the present disclosure, the multi-card terminal can determine an occurrence of a paging collision when the paging timing of at least two SIM cards is the same. The at least two SIM cards with paging collisions include a target SIM card. The target SIM card is a SIM card of a multi-card terminal in an inactive state, and the target base station is the base station where the target SIM card resides.

In the embodiment, the target indication information reported by the target SIM card of the multi-card terminal in the inactive state can be used to solve the paging collision problem for the multi-card terminal and ensure the normal operation of the multi-card terminal services.

In some embodiments, for step 101 above, the target SIM card can transmit target indication information to the target base station in any of the following methods.

The first method is to transmit a reserved preamble indicating the occurrence of the paging collision to the target base station. In the case of using the reserved preamble as the target indication information, in order to facilitate the network side to transmit the target configuration information to the target SIM card after determining the target configuration information, the target SIM card can further report the SIM card identification information of the target SIM card to the target base station while reporting the reserved preamble.

The second method is to report target indication information to the target base station through target RRC signalling.

In the embodiments of the present disclosure, the target RRC signalling may include, but is not limited to, any of the following: RRCResumeRequest signalling in the NR system, RRCConnectionResumeRequest signalling in the eLTE (enhanced Long Term Evolution) system, RRCResumeComplete signalling in the NR system, and RRCConnectionResumeComplete signalling in the eLTE system.

In the above embodiments, the target SIM card can transmit target indication information to the target base station in any of the above methods, so that the network side can solve the paging collision problem for multi-card terminals based on the target indication information, which is easy to implement and has high availability.

In some embodiments, when the target SIM card uses the reserved preamble as the target indication information, the reserved preamble can be reserved and configured by the target base station for the target SIM card.

In an example, the target base station can configure at least one reserved preamble for the target SIM card, and the target SIM card can select one of the at least one reserved preamble as the target indication information, where the target SIM card can randomly select one of the at least one reserved preamble or select one of the at least one reserved preamble according to a preset order as the target indication information.

In some embodiments, when the target SIM card uses a reserved preamble as the target indication information, the reserved preamble can be determined by the target SIM card based on a predefined setting, where the predefined setting includes, but is not limited to, an agreement setting in the protocol.

In an example, if the predefined setting includes multiple reserved preambles that can serve as target indication information, the target SIM card can select one of the multiple reserved preambles as the target indication information, where the target SIM card can randomly select one of the multiple reserved preambles or select one of the multiple reserved preambles according to a preset order as the target indication information.

In the above embodiments, the target SIM card can use any of the above methods to transmit a reserved preamble for indicating the occurrence of a paging collision to the target base station, which is easy to implement and has high availability.

In some embodiments, the target SIM card can use any of the following methods to report target indication information to the target base station through target RRC signalling.

The first method is to report target indication information to the target base station through an existing information element in the target RRC signalling.

In this method, the target SIM card can add the target indication information to a first information element in the target RRC signalling, and then report the target RRC signalling to the target base station.

The second method is to report target indication information to the target base station through a newly added information element in the target RRC signalling.

In this method, the target SIM card can add a second information element corresponding to the target indication information into the target RRC signalling, and then report the target RRC signalling to the target base station.

In the above embodiments, the target SIM card can use, but is not limited to, any of the above methods to report target indication information to the target base station through target RRC signalling, which has high availability.

In some embodiments, referring to FIG. 2, FIG. 2 is a flowchart of a method for information transmission according to the embodiments shown in FIG. 1. The method may further include the following steps 102 and 103.

In step 102, the target configuration information transmitted by the target base station is received by the target SIM card.

In the embodiments of the present disclosure, the target configuration information is new configuration information related to a paging process of the target SIM card, including but not limited to at least one of: a new temporary SIM card identification information of the target SIM card, an offset value of the temporary SIM card identification information of the target SIM card, an offset value of the paging timing corresponding to the target SIM card, or a new gap pattern configuration information corresponding to the target SIM card. Where the gap pattern configuration information can be configured to indicate the time slot information corresponding to the paging timing configured for the target SIM card by the network side. That is, the target SIM card can directly determine the time slot resources for monitoring and receiving paging signalling according to the gap pattern configuration information.

In step 103, the paging signalling is monitored and received by the target SIM card according to the target configuration information.

In the above embodiment, after the multi-card terminal receives the target configuration information transmitted by the target base station, the target SIM card can monitor and receive the paging signalling based on the new target configuration information configured for the target SIM card by the network side. The problem of paging collision on the multi-card terminal is solved, which ensures the normal operation of the multi-card terminal services.

In some embodiments, for step 103 above, the process of the target SIM card monitoring and receiving the paging signalling according to the target configuration information may include: in a case where the target configuration information includes new temporary SIM card identification information of the target SIM card, the target SIM card can, based on the new temporary SIM card identification information and according to the corresponding relationship between the SIM card identification information and the paging timing in the related art, determining an updated paging timing corresponding to the new temporary SIM card identification information. The target SIM card can monitor and receive paging signalling for paging the target SIM card when the updated paging timing arrives.

In a case where the target configuration information includes the offset value of the temporary SIM card identification information of the target SIM card, the target SIM card can determine a new temporary SIM card identification information of the target SIM card based on the offset value of the temporary SIM card identification information and a stored temporary SIM card identification information of the target SIM card. According to the corresponding relationship between the SIM card identification information and the paging timing in the related art, an updated paging timing corresponding to the new temporary SIM card identification information can be determined. The target SIM card can monitor and receive paging signalling for paging the target SIM card at the updated paging timing. In a case where the target configuration information includes an offset value of the paging timing corresponding to the target SIM card, the target SIM card can directly determine an updated paging timing based on a current paging timing and the offset value of the paging timing indicated by the target configuration information. When the updated paging timing arrives, the target SIM card can monitor and receive paging signalling for paging the target SIM card.

In a case where the target configuration information includes the gap pattern configuration information corresponding to the target SIM card, the target SIM card can directly use a new time slot resource indicated by the gap pattern configuration information as an updated paging timing, and monitor and receive a paging signal.

In the above embodiments, to solve the paging collision problem for the multi-card terminal, the network side can, based on the target indication information reported by the target SIM card in the inactive state, send the target configuration information to the target SIM card, and the target SIM card can determine an updated paging timing based on the target configuration information, and then monitor and receive paging signalling at the updated paging timing, which solves the paging collision problem of the multi-card terminal and ensures the normal operation of the multi-card terminal services.

In some embodiments, referring to FIG. 3, FIG. 3 is a flowchart of a method for information transmission according to the embodiments shown in FIG. 2. The method may further include the following step 104.

In step 104, target assistance information is reported by the target SIM card to the target base station.

In the embodiments of the present disclosure, the execution order of step 103 and step 104 is not limited, and step 103 and step 104 can be executed synchronously or sequentially.

Target assistance information is configured to assist the network side in determining the target configuration information, and the target assistance information includes but is not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal.

In the above embodiments, the target SIM card can assist network-side devices in quickly determining target configuration information by reporting the target assistance information, thereby solving the paging collision problem for the multi-card terminal, which has high availability.

The method for information transmission provided in the embodiments of the present disclosure is introduced from the target base station side below.

A method for information transmission is provided in some embodiments of the present disclosure, as shown in FIG. 4. FIG. 4 is a flowchart of a method for information transmission according to another embodiment. The method can be performed by a target base station where a target SIM card of a multi-card terminal in an inactive state resides. The method can include the following steps 201 and 202.

In step 201, in response to receiving target indication information reported by the target SIM card to indicate an occurrence of a paging collision, target configuration information is determined.

In the embodiments of the present disclosure, the target configuration information is new configuration information related to a paging process of the target SIM card, including but not limited to at least one of: a new temporary SIM card identification information of the target SIM card, an offset value of the temporary SIM card identification information of the target SIM card, an offset value of the paging timing corresponding to the target SIM card, or a new gap pattern configuration information corresponding to the target SIM card.

In step 202, the target configuration information is transmitted to the target SIM card.

In the embodiments of the present disclosure, the target base station can directly transmit the target configuration information to the target SIM card through unicast RRC signalling.

In the above embodiments, the target base station can determine the target configuration information based on the target indication information to indicate an occurrence of a paging collision reported by the target SIM card, and then transmit the target configuration information to the target SIM card to solve the paging collision problem for the multi-card terminal.

In some embodiments, the target base station can configure the target configuration information for the target SIM card based on at least one of the target assistance information or the paging configuration information pre-stored on the target base station associated with the paging process corresponding to at least one SIM card of the multi-card terminal.

The target assistance information is reported by the target SIM card and configured to assist the network side in determining the target configuration information, and the target assistance information includes but is not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal. The paging configuration information may include but be not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal.

The target configuration information includes at least one of a new temporary SIM card identification information of the target SIM card, an offset value of the temporary SIM card identification information of the target SIM card, an offset value of paging timing corresponding to the target SIM card, or new gap pattern configuration information corresponding to the target SIM card.

In the embodiments of the present disclosure, based on the target indication information, an occurrence of a paging collision on the multi-card terminal is determined, indicating that the paging timing of at least one SIM card of the multi-card terminal is consistent with the paging timing of the target SIM card. Correspondingly, the process of the target base station configuring the target configuration information for the target SIM card based on at least one of the target assistance information or the paging configuration information pre-stored on the target base station associated with the paging process corresponding to at least one SIM card of the multi-card terminal may include the following steps.

The target base station can determine a new temporary SIM card identification information for the target SIM card, enabling the target SIM card to determine an updated paging timing of the target SIM card based on the new temporary SIM card identification information. The target SIM card monitors and receives paging signalling at the updated paging timing, thereby staggering the paging timing of the target SIM card from the paging timing of a SIM card having the paging collision problem, and solving the paging collision problem for the multi-card terminal.

Alternatively, the target base station can determine an offset value of the temporary SIM card identification information of the target SIM card for the target SIM card, so that the target SIM card can determine the new temporary SIM card identification information on its own, enabling the target SIM card to determine an updated paging timing of the target SIM card based on the new temporary SIM card identification information. The target SIM card monitors and receives paging signalling at the updated paging timing, thereby staggering the paging timing of the target SIM card from the paging timing of a SIM card having the paging collision problem, and solving the paging collision problem for the multi-card terminal.

Alternatively, the target base station can determine an offset value of the paging timing corresponding to the target SIM card for the target SIM card, and the SIM card with which the target SIM card has paging collision still monitors and receives a corresponding paging signalling at the previous paging timing. The target SIM card can determine an updated paging timing based on the offset value of the paging timing, and the target SIM card monitors and receives the paging signalling of the target SIM card at the updated paging timing. Thus, the paging timing of the target SIM card is staggered from the paging timing of the SIM card having a paging collision problem, solving the paging collision problem for multi-card terminals.

Alternatively, the target base station can configure a corresponding new gap pattern configuration information for the target SIM card, and the SIM card with which the target SIM card has a paging collision still monitors and receives corresponding paging signalling at the previous paging timing. The target SIM card, based on the new gap pattern configuration information, can determine an updated paging timing. The target SIM card, at the updated paging timing, monitors and receives paging signalling corresponding to the target SIM card, so as to solve the paging collision problem for the multi-card terminal.

In the above embodiment, the target base station can directly configure the target configuration information for the target SIM card, thereby solving the paging collision problem for the multi-card terminal, which has high availability.

In some embodiments, the target base station can, in a case that the target configuration information cannot be directly configured for the target SIM card, at least transmit target indication information to a designated network device, and the target configuration information transmitted by the designated network device can be obtained. The target configuration information includes at least one of a new temporary SIM card identification information of the target SIM card, an offset value of the temporary SIM card identification information of the target SIM card, an offset value of paging timing corresponding to the target SIM card, or new gap pattern configuration information corresponding to the target SIM card.

In an example, the target base station can transmit target indication information to a designated network device. In an example, the target base station can transmit target indication information and target assistance information to a designated network device. The target assistance information is reported by the target SIM card and configured to assist the network side in determining the target configuration information, and the target assistance information includes but is not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal.

mation to the anchor base station, to receive the target configuration information transmitted by the anchor base station. The anchor base station corresponding to the target SIM card refers to the last base station that provides services to the target SIM card before the target SIM card switches to an inactive state.

In the above embodiment, the target base station can, when the target base station is unable to directly configure target configuration information for the target SIM card and the target base station is different from the anchor base station, at least transmit target indication information to the anchor base station corresponding to the target SIM card, to receive the target configuration information transmitted by the anchor base station side, and subsequently transmit the target configuration information to the target SIM card, thereby solving the paging collision problem for the multi-card terminal.

In some embodiments, the target base station may, based on an inter base station interface including but not limited to X2 or Xn interface, at least transmit target indication information to the anchor base station through first signalling.

The first signalling includes but is not limited to the RETRIEVE UE CONTEXT REQUEST signalling. The RETRIEVE UE CONTENT REQUEST signalling is transmitted by a new NG-RAN node to an old NG-RAN node, which is configured to request the old NG-RAN node to transmit the UE context to the new NG-RAN node. In the embodiments of the present disclosure, the new NG-RAN node refers to the target base station, which is the base station where the target SIM card resides. The old NG-RAN node refers to the anchor base station corresponding to the target SIM card, which stores the UE context.

In some embodiments, the target base station may transmit the first signalling to the anchor base station at least after adding the target indication information to an original information element of the first signalling, where the original information element is a third information element. The third information element includes, but is not limited to, the resumeCause information element.

The explanation of the resumeCause information element in related technologies is shown in Table 1.

TABLE 1

| IE (information element)/Group Name | Presence | Range | IE type and reference | Semantics description | Criticality | Assigned Criticality |
|---|---|---|---|---|---|---|
| RRC Resume Cause | O | | 9.2.3.61 | In case of RNA Update, contains the cause value provided by the UE in the RRCResumeRequest or the RRCResumeRequest message, as defined in TS 38.331 [10], or in the RRCConnectionResumeRequest message, as defined in TS 36.331 [14] | YES | Ignore |

In the above embodiments, the target base station can at least transmit target indication information to the designated network device, to obtain target configuration information from the designated network device, and then transmit the target configuration information to the target SIM card, to solve the paging collision problem for the multi-card terminal.

In some embodiments, in a case where the anchor base station corresponding to the target SIM card and the target base station are different base stations, the designated network device includes the anchor base station, and the target base station can at least transmit the target indication infor- It can be understood that each element in Table 1 exists independently, and these elements are listed in the same table as an example, but it does not mean that all elements in the table must exist simultaneously, as shown in the table. The value of each element is independent of any other element values in Table 1. Therefore, those skilled in the art can understand that the value of each element in Table 1 is an independent embodiment.

In the above embodiments, the target base station can at least, after adding the target indication information to the original information element in the first signalling, transmit the first signalling to the anchor base station, which achieves the purpose of transmitting the target indication information to the anchor base station. The target base station can subsequently receive the target configuration information transmitted by the anchor base station and transmit the target configuration information to the target SIM card to solve the paging collision problem for the multi-card terminal.

In some embodiments, the target base station may at least add a new information element, i.e., a fourth information element, configured to indicate the target indication information into the first signalling, and then transmit the first signalling to the anchor base station.

In the above embodiments, the target base station can at least, after adding a new information element corresponding to the target indication information into the first signalling, transmit the first signalling to the anchor base station, which achieves the purpose of transmitting the target indication information to the anchor base station. The target base station can subsequently receive the target configuration information transmitted by the anchor base station and transmit the target configuration information to the target SIM card to solve the paging collision problem for the multi-card terminal.

In some embodiments, in a case where the target base station and the anchor base station corresponding to the target SIM card are the same base station and the designated network device includes the core network device, the target base station can, when the target base station is unable to directly configure target configuration information for the target SIM card, at least transmit target indication information to the core network device.

In the embodiments of the present disclosure, the target base station can transmit at least target indication information to the core network device based on the NG interface between the base station and the core network device, and the core network device configures target configuration information for the target SIM card.

In the above embodiments, the target base station can, when the target base station is unable to directly configure target configuration information for the target SIM card and the target base station and the anchor base station are the same base station, at least transmit target indication information to the core network device, so that the core network device can configure target configuration information for the target SIM card. Subsequently, the target base station can transmit the target configuration information to the target SIM card, thereby solving the paging collision problem for the multi-card terminal.

In some embodiments, in a case where the target SIM card uses the reserved preamble as the target indication information, as shown in FIG. 5 (FIG. 5 is a flowchart of a method for information transmission according to the embodiments shown in FIG. 4), before performing step 201, the method may further include the following steps.

In step 200, the reserved preamble for the target SIM card is configured, and the configured reserved preamble is transmitted to the target SIM card.

In the embodiments of the present disclosure, at least one reserved preamble that can be used as target indication information can be configured by the target base station for the target SIM card, and then the configured reserved preamble can be transmitted to the target SIM card, so that the target SIM card can select one of the at least one reserved preamble as target indication information, which is easy to implement and has high availability.

The method for information transmission provided in the embodiments of the present disclosure is introduced from the anchor base station side below.

A method for information transmission is provided in some embodiments of the present disclosure, as shown in FIG. 6. FIG. 6 is a flowchart of a method for information transmission according to another embodiment. The method can be performed by an anchor base station corresponding to a target SIM card of a multi-card terminal in an inactive state. The anchor base station is the last base station that serves the target SIM card before the target SIM card of the multi-card terminal in the inactive state switches to the inactive state. The method may include the following steps: 301 and 302.

In step 301, in response to receiving target indication information to indicate an occurrence of a paging collision, target configuration information is determined.

In the embodiments of the present disclosure, the anchor base station can receive target indication information transmitted by the target SIM card or target base station, where the target base station is a base station where the target SIM card resides. The target configuration information includes, but is not limited to, at least one of a new temporary SIM card identification information of the target SIM card, an offset value of the temporary SIM card identification information of the target SIM card, an offset value of paging timing corresponding to the target SIM card or new gap pattern configuration information corresponding to the target SIM card.

In step 302, the target configuration information is transmitted to a designated device.

In the embodiments of the present disclosure, the designated device can be a target SIM card or a target base station.

In the above embodiments, the anchor base station corresponding to the target SIM card can determine the target configuration information based on the received target indication information and transmit the target configuration information to the designated device, thereby solving the paging collision problem for the multi-card terminal and ensuring the normal operation of multi-card terminal services.

In some embodiments, in the case where the base station where the target SIM card resides is an anchor base station, that is, the anchor base station corresponding to the target SIM card is the same as the target base station mentioned above, step 301 may include receiving the target indication information reported by the target SIM card.

Correspondingly, the designated device mentioned above includes the target SIM card. In step 302 above, the anchor base station can directly transmit the target configuration information to the target SIM card after determining the target configuration information.

In an example, the anchor base station can transmit the target configuration information to the target SIM card through unicast RRC signalling.

In the above embodiments, the anchor base station can determine the target configuration information after receiving the target indication information reported by the target SIM card, and then transmit the target configuration information to the target SIM card, to solve the paging collision problem for the multi-card terminal.

In some embodiments, in a case where the base station where the target SIM card resides (i.e., the target base station) and the anchor base station are different base stations, step 301 may include receiving the target indication information transmitted by the target base station. The target base station is a base station where the target SIM card resides.

Correspondingly, the designated device mentioned above includes the target base station. In step 302 above, the anchor base station can transmit the target configuration information to the target base station after determining the target configuration information. After the target base station receives the target configuration information, the target base station transmits the target configuration information to the target SIM card, so that the target SIM card can monitor and receive paging signalling based on the target configuration information.

In the above embodiments, the anchor base station can determine the target configuration information after receiving the target indication information transmitted by the target base station, and then transmit the target configuration information to the target base station, to solve the paging collision problem for the multi-card terminal.

In some embodiments, the anchor base station can determine target configuration information in any of the following methods.

The first method is to configure the target configuration information for the target SIM card by the anchor base station. In this method, the anchor base station can configure the target configuration information for the target SIM card based on target assistance information and/or pre-stored paging configuration information related to the paging process corresponding to at least one SIM card of the multi-card terminal. The target assistance information is reported by the target SIM card and configured to assist the network side in determining the target configuration information, and the target assistance information includes but is not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal. The paging configuration information may include but be not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal.

In the embodiments of the present disclosure, the anchor base station configures the target configuration information for the target SIM card based on the target assistance information and/or pre-stored paging configuration information related to the paging process corresponding to at least one SIM card of the multi-card terminal, which is consistent with the process of configuring the target configuration information for the target SIM card by the target base station, and will not be repeated here.

In the second method, the anchor base station at least transmits the target indication information to the core network device, and the core network device configures the target configuration information for the target SIM card.

In this method, the anchor base station can, through the NG interface between the base station and the core network device, transmit target indication information to the core network device, or transmit target indication information and target assistance information together to the core network device. The core network device can configure the target configuration information for the target SIM card based on target assistance information and/or pre-stored paging configuration information related to the paging process corresponding to at least one SIM card of the multi-card terminal.

In the above embodiments, the anchor base station corresponding to the target SIM card can configure target configuration information for the target SIM card, or at least transmit target indication information to the core network device, and the core network device configures target configuration information for the target SIM card, thereby solving the paging collision problem for the multi-card terminal, which has high availability.

In some embodiments, when the target base station and the anchor base station are different base stations, after the anchor base station determines the target configuration information, the anchor base station can transmit the target configuration information to the target base station through second signalling based on the interface between the base stations.

The second signalling includes, but is not limited to, the RETRIEVE UE CONTAXT RESPONSE signalling. RETRIEVE UE CONTAXT RESPONSE signalling is transmitted from an old NG-RAN node to a new NG-RAN node for transmitting terminal context signalling. In the embodiments of the present disclosure, the old NG-RAN node refers to the anchor base station corresponding to the target SIM card, while the new NG-RAN node refers to the target base station.

In the above embodiments, after determining the target configuration information, the anchor base station can transmit the target configuration information to the target base station through the second signalling, so that the target base station can transmit the target configuration information to the target SIM card, which is easy to implement and has high availability.

In some embodiments, the anchor base station can transmit the second signalling to the target base station by adding the target configuration information to the original information element in the second signalling, where the original information element is a fifth information element.

In the case where the second signalling includes the RETRIEVE UE CONTAXT RESPONSE signalling, the fifth information element may include, but is not limited to, the original UE Context Information Retrieve UE Context Response information element in the RETRIEVE UE CONTAXT RESPONSE signalling.

In related technologies, the explanation of UE Context Information Retrieve UE Context Response information element is shown in Table 2.

TABLE 2

| IE (information element)/Group Name | Presence | Range | IE type and reference | Semantics description | Criticality | Assigned Criticality |
|---|---|---|---|---|---|---|
| UE Context Information Retrieve UE Context Response | M | | 9.2.1.13 | | YES | Reject |

It can be understood that each element in Table 2 exists independently, and these elements are listed in the same table as an example, but it does not mean that all elements in the table must exist simultaneously as shown in the table. The value of each element is independent of any other element values in Table 2. Therefore, those skilled in the art can understand that the value of each element in Table 2 is an independent embodiment.

In the above embodiments, the anchor base station can transmit the second signalling to the target base station by adding target configuration information to the fifth information element in the second signalling, to transmit target configuration information to the target base station, which has high availability.

In some embodiments, the anchor base station can transmit the second signalling to the target base station by adding a new information element corresponding to the target configuration information, i.e., a sixth information element, into the second signalling.

In the above embodiments, the anchor base station can, after adding a new information element corresponding to the target configuration information into the second signalling, transmit the second signalling to the target base station, to transmit the target configuration information to the target base station, which has high availability.

The method for information transmission provided in the embodiments of the present disclosure is introduced from the core network device side below.

A method for information transmission is provided in an embodiment of the present disclosure, as shown in FIG. 7. FIG. 7 is a flowchart of a method for information transmission according to another embodiment. The method can be performed by the core network device. The method can include the following steps 401 and 402.

In step 401, in response to receiving target indication information that is transmitted by the anchor base station corresponding to the target SIM card of the multi-card terminal in the inactive state and configured to indicate an occurrence of a paging collision, the target configuration information is determined.

In the embodiments of the present disclosure, the anchor base station refers to the last base station that provides services to the target SIM card before the target SIM card switches to an inactive state. The target configuration information is new configuration information related to a paging process of the target SIM card, including but not limited to at least one of: a new temporary SIM card identification information of the target SIM card, an offset value of the temporary SIM card identification information of the target SIM card, an offset value of the paging timing corresponding to the target SIM card, or a new gap pattern configuration information corresponding to the target SIM card.

In step 402, the target configuration information is transmitted to the anchor base station.

In the embodiments of the present disclosure, after the core network device determines the target configuration information, the core network device can transmit the target configuration information to the anchor base station through the NG interface between the core network device and the base station.

In the above embodiments, the target configuration information can be determined and then transmitted to the anchor base station by the core network device. After receiving the target configuration information, the anchor base station can transmit the target configuration information to the target base station or target SIM card, thereby solving the paging collision problem for the multi-card terminal, which has high availability.

In some embodiments, the core network device can configure the target configuration information for the target SIM card based on target assistance information and/or pre-stored paging configuration information of the target SIM card. The process of configuring target configuration information for the core network device is consistent with the process of configuring target configuration information for the target base station, and will not be repeated here.

The target assistance information is reported by the target SIM card and configured to assist the network side in determining the target configuration information, and the target assistance information includes but is not limited to at least one of temporary SIM card identification information currently used by the target SIM card and/or other SIM cards of the multi-card terminal, paging timing currently corresponding to the target SIM card and/or other SIM cards of the multi-card terminal, or gap pattern configuration information currently used by the target SIM card and/or other SIM cards of the multi-card terminal.

In the above embodiments, the core network device can configure the target configuration information for the target SIM card, ultimately allowing the target SIM card to monitor and receive paging signalling based on the target configuration information, thereby solving the paging collision problem for the multi-card terminal.

In some embodiments, as shown in FIG. 8A, the target SIM card of the multi-card terminal, before switching to an inactive state, is last served by base station #1, that is, the anchor base station of the target SIM card is base station #1. When the multi-card terminal determines that there is a paging collision, the base station where the target SIM card of the multi-card terminal in the inactive state resides is base station #2; that is, the target base station is base station #2. In this case, the anchor base station corresponding to the target SIM card and the target base station are different base stations.

Figure 8B:
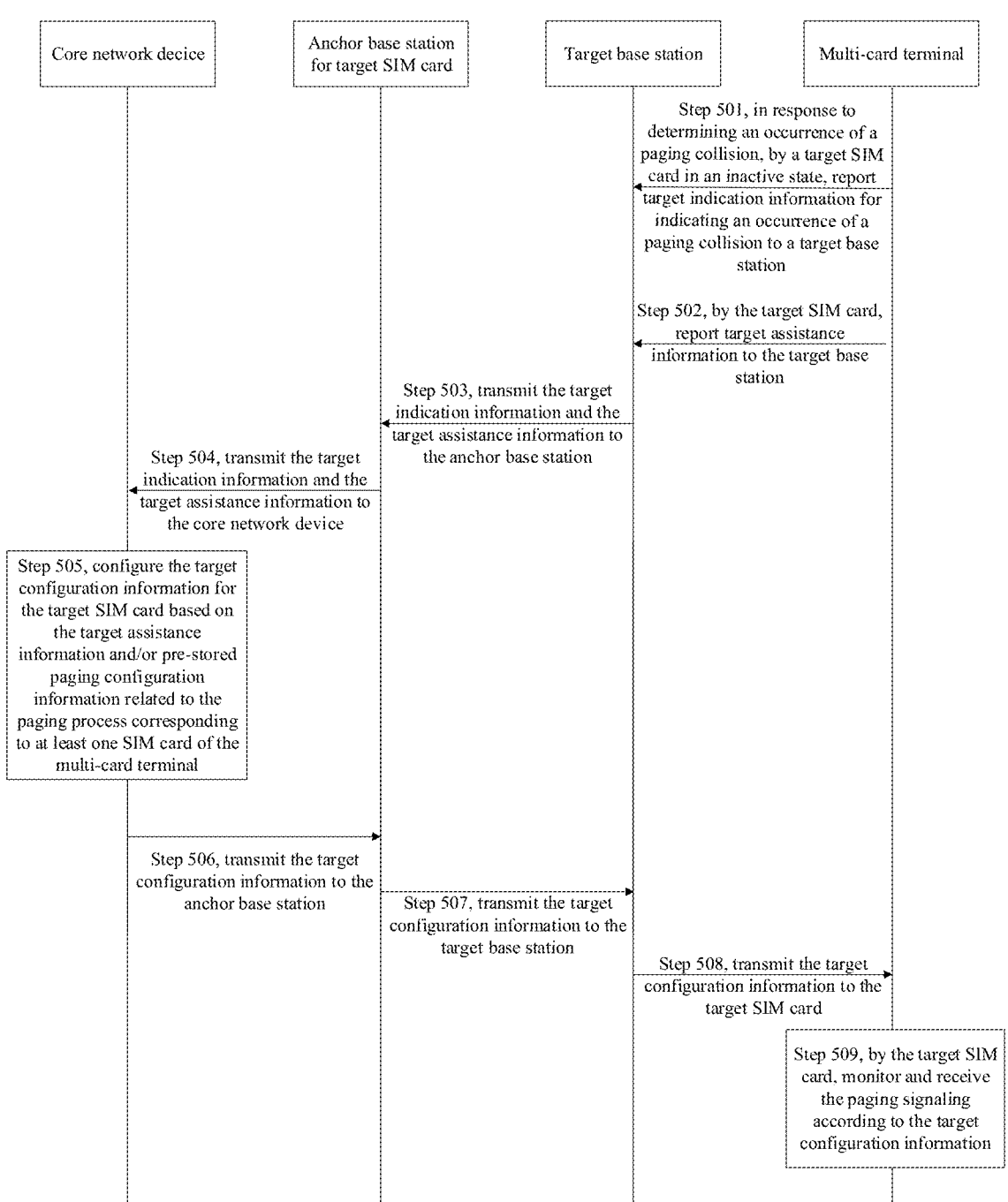
FIG. 8B is a flowchart of a method for information transmission according to an embodiment.

In the scenario of FIG. 8A above, in the present disclosure, a method for information transmission is provided, as shown in FIG. 8B. FIG. 8B is a schematic diagram of a method for information transmission according to an embodiment. The method may include the following steps.

In step 501, in response to the multi-card terminal determining an occurrence of a paging collision, by a target SIM card in an inactive state, target indication information for indicating an occurrence of a paging collision is reported to a target base station.

The target base station is a base station where the target SIM card resides.

In step 502, by the target SIM card, target assistance information is reported to the target base station.

In the embodiments of the present disclosure, the target assistance information is configured to assist the network side in determining the target configuration information.

In step 503, the target base station transmits the target indication information and the target assistance information to the anchor base station.

The target base station transmits the target indication information and the target assistance information to the anchor base station through the first signalling.

In step 504, the anchor base station transmits the target indication information and the target assistance information to the core network device.

In step 505, the core network device can configure the target configuration information for the target SIM card based on the target assistance information and/or pre-stored paging configuration information related to the paging process corresponding to at least one SIM card of the multi-card terminal.

In step 506, the core network device transmits the target configuration information to the anchor base station.

The core network devices transmit target configuration information to the anchor base station through the NG interface.

In step 507, the anchor base station transmits the target configuration information to the target base station.

The anchor base station can transmit the target configuration information to the target base station through the second signalling.

In step 508, the target base station transmits the target configuration information to the target SIM card.

The target base station can transmit the target configuration information to the target SIM card through unicast RRC signalling.

In step 509, by the target SIM card, the paging signalling is monitored and received according to the target configuration information.

In the above embodiments, when the target base station and anchor base station are different base stations, the core network device can configure the target configuration information for the target SIM card based on the target indication information reported by the target SIM card of the multi-card terminal in the inactive state. The target SIM card can monitor and receive paging signalling based on the target configuration information, thereby solving the paging collision problem for the multi-card terminal and ensuring the normal operation of the multi-card terminal services.

In some embodiments, the above steps 504 to 506 can be replaced by the following step 504' (not shown in FIG. 8B):

In step 504', the anchor base station can configure the target configuration information for the target SIM card based on the target assistance information and/or pre-stored paging configuration information related to the paging process corresponding to at least one SIM card of the multi-card terminal.

In the embodiments of the present disclosure, the target configuration information can be directly configured by the anchor base station for the target SIM card.

After completing step 504', step 507 is directly executed; that is, after the anchor base station configures the target configuration information, the anchor base station transmits the target configuration information to the target base station.

In the above embodiments, the anchor base station corresponding to the target SIM card can configure the target configuration information for the target SIM card based on the target indication information reported by the target SIM card of the multi-card terminal in the inactive state. The target SIM card can monitor and receive paging signalling based on the target configuration information, thereby solving the paging collision problem for the multi-card terminal and ensuring the normal operation of the multi-card terminal services.

In some embodiments, the above steps 503 to 507 can be replaced by the following step 503' (not shown in FIG. 8B).

In step 503', the target base station can configure the target configuration information for the target SIM card based on target assistance information and/or pre-stored paging configuration information related to the paging process corresponding to at least one SIM card of the multi-card terminal.

In the embodiments of the present disclosure, the target configuration information can be directly configured by the target base station for the target SIM card.

After completing step 503', step 508 is directly executed; that is, after the target base station configures the target configuration information, the target base station transmits the target configuration information to the target SIM card.

In the above embodiments, the target base station can configure the target configuration information for the target SIM card based on the target indication information reported by the target SIM card of the multi-card terminal in the inactive state. The target SIM card can monitor and receive paging signalling based on the target configuration information, thereby solving the paging collision problem for the multi-card terminal and ensuring the normal operation of the multi-card terminal services.

Figure 9A:
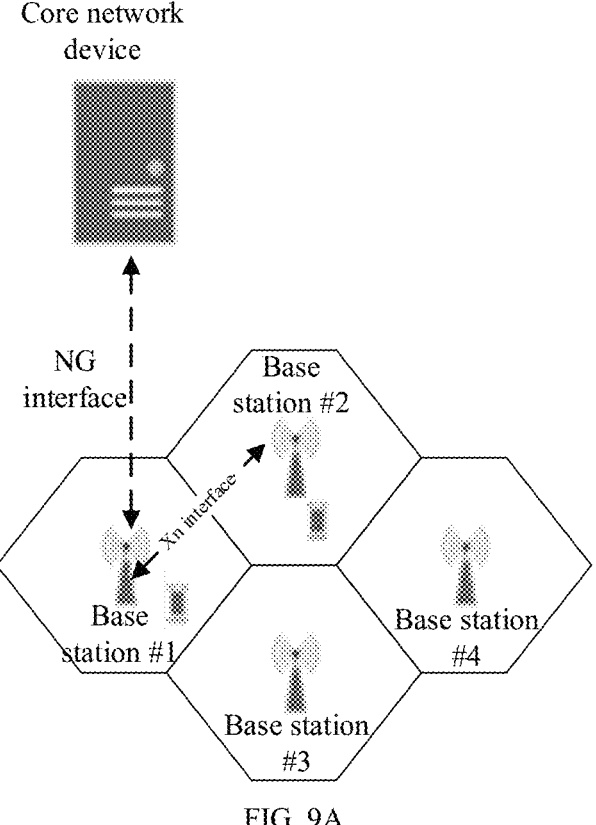
FIG. 9A is a schematic diagram of an information transmission scenario according to an embodiment.

In some embodiments, as shown in FIG. 9A, the target SIM card of the multi-card terminal, before switching to an inactive state, is last served by base station #1, that is, the anchor base station of the target SIM card is base station #1. When the multi-card terminal determines that there is a paging collision, the base station where the target SIM card of the multi-card terminal in the inactive state resides is still base station #1; that is, the target base station is base station #1. In this case, the anchor base station corresponding to the target SIM card and the target base station are the same base station.

Figure 9B:
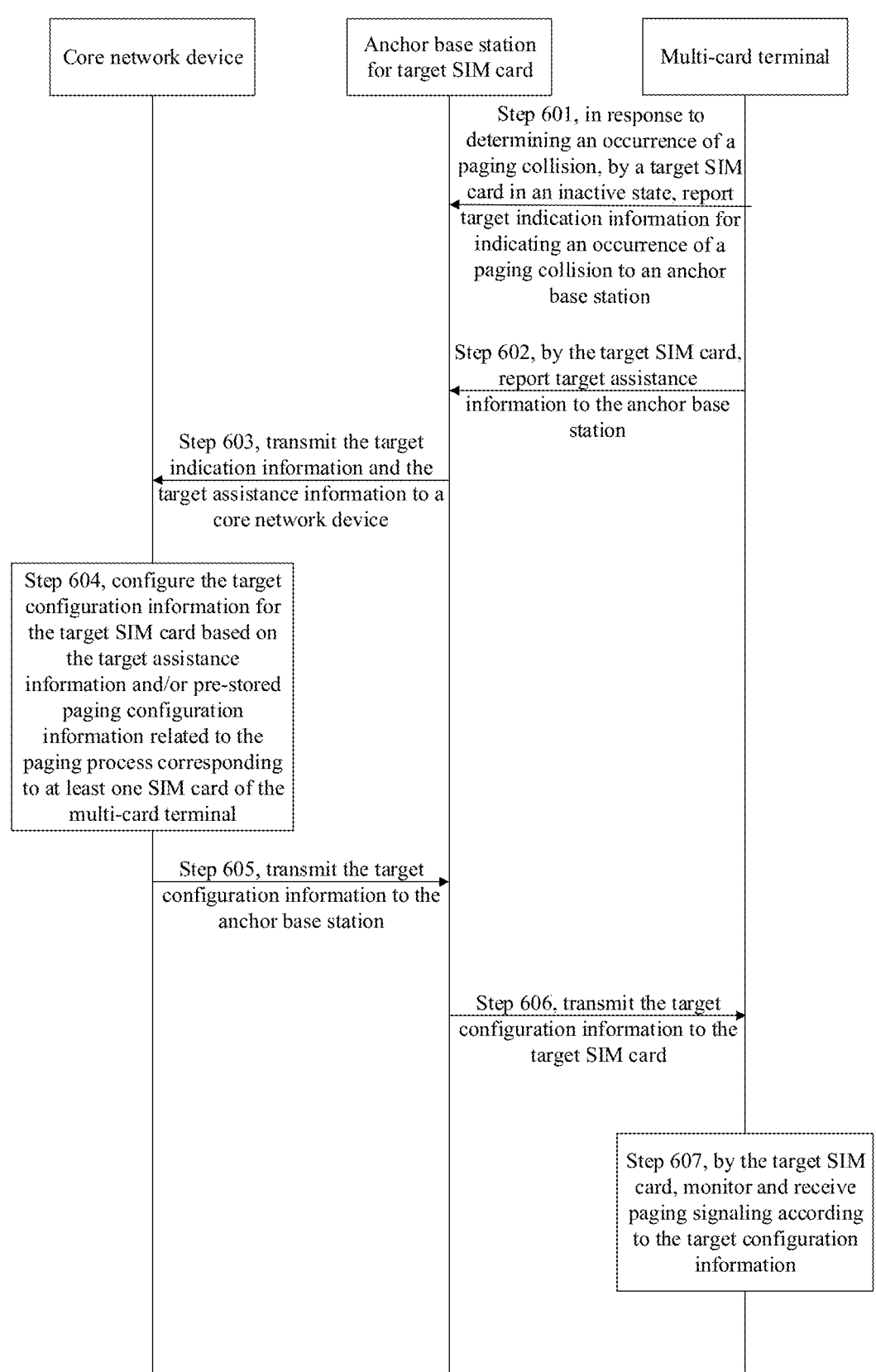
FIG. 9B is a flowchart of a method for information transmission according to an embodiment.

In the scenario of FIG. 9A above, in the present disclosure, a method for information transmission is provided, as shown in FIG. 9B. FIG. 9B is a schematic diagram of a method for information transmission according to an embodiment. The method may include the following steps.

In step 601, in response to the multi-card terminal determining an occurrence of a paging collision, by a target SIM card in an inactive state, target indication information for indicating an occurrence of a paging collision is reported to an anchor base station.

In step 602, by the target SIM card, target assistance information is reported to the anchor base station.

In the embodiments of the present disclosure, the target assistance information is configured to assist the network side in determining the target configuration information.

In step 603, the anchor base station transmits the target indication information and the target assistance information to a core network device.

In step 604, the core network device can configure the target configuration information for the target SIM card based on the target assistance information and/or pre-stored paging configuration information related to the paging process corresponding to at least one SIM card of the multi-card terminal.

In step 605, the core network device transmits the target configuration information to the anchor base station.

In step 606, the anchor base station transmits the target configuration information to the target SIM card. The anchor base station can transmit the target configuration information to the target SIM card through unicast RRC signalling.

In step 607, by the target SIM card, paging signalling is monitored and received according to the target configuration information.

In the above embodiments, when the target base station and the anchor base station are the same, the core network device can configure the target configuration information for the target SIM card based on the target indication information reported by the target SIM card of the multi-card terminal in the inactive state. The target SIM card can monitor and receive paging signalling based on the target configuration information, thereby solving the paging collision problem for the multi-card terminal and ensuring the normal operation of the multi-card terminal services.

In some embodiments, the above steps 603 to 605 can be replaced by step 603' (not shown in FIG. 9B).

In step 603', the anchor base station can configure the target configuration information for the target SIM card based on the target assistance information and/or pre-stored paging configuration information related to the paging process corresponding to at least one SIM card of the multi-card terminal.

In the embodiments of the present disclosure, the target configuration information can be directly configured by the anchor base station for the target SIM card.

After completing step 603', step 606 is directly executed; that is, after the anchor base station configures the target configuration information, the anchor base station transmits the target configuration information to the target SIM card.

In the above embodiments, the anchor base station corresponding to the target SIM card can configure the target configuration information for the target SIM card based on the target indication information reported by the target SIM card of the multi-card terminal in the inactive state. The target SIM card can monitor and receive paging signalling based on the target configuration information, thereby solving the paging collision problem for the multi-card terminal and ensuring the normal operation of the multi-card terminal services.

Corresponding to the above method embodiments implementing application functions, the present disclosure further provides embodiments of apparatuses for implementing application functions.

Figures 10, 11, 12, 13:
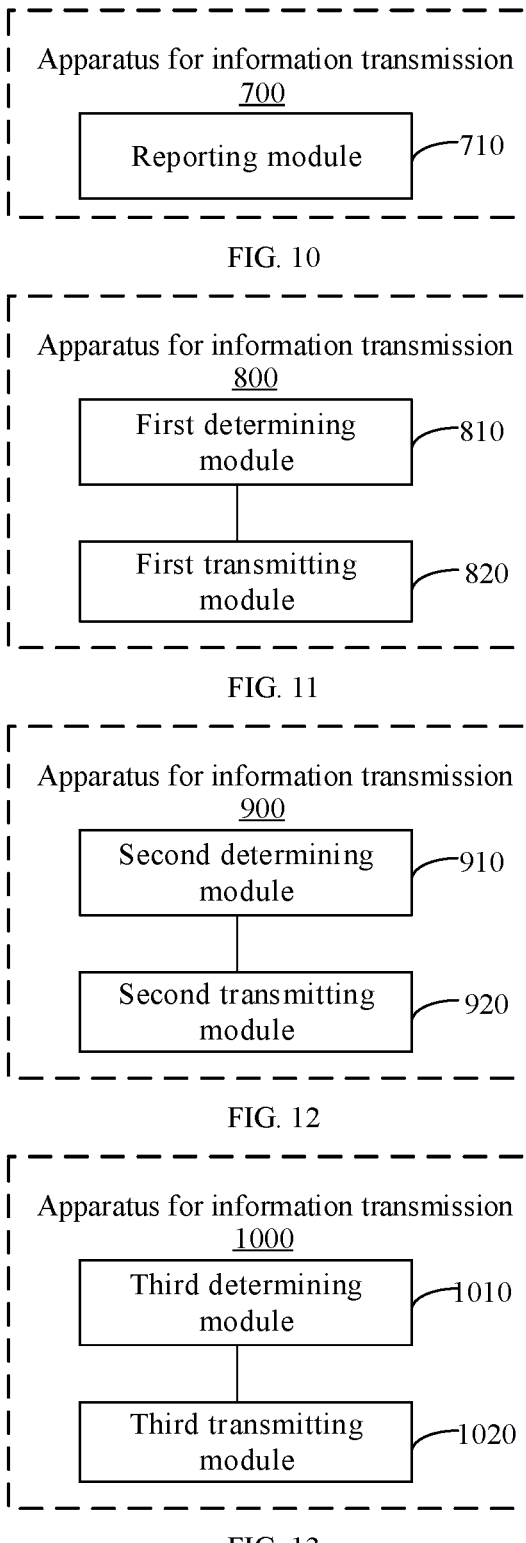
FIG. 10 is a block diagram of an apparatus for information transmission according to an embodiment.
FIG. 11 is a block diagram of an apparatus for information transmission according to an embodiment.
FIG. 12 is a block diagram of an apparatus for information transmission according to an embodiment.
FIG. 13 is a block diagram of an apparatus for information transmission according to an embodiment.

Referring to FIG. 10, FIG. 10 is a block diagram of an apparatus for information transmission 700 according to an embodiment. The apparatus 700 is applied to a multi-card terminal and includes a reporting module 710, configured to, in response to determining an occurrence of a paging collision, report, by a target SIM card in an inactive state, target indication information indicating an occurrence of a paging collision to a target base station, where the target base station is a base station where the target SIM card resides.

Referring to FIG. 11, FIG. 11 is a block diagram of an apparatus for information transmission 800 according to an embodiment. The apparatus 800 is applied to a target base station where a target SIM card of a multi-card terminal in an inactive state resides, and includes a first determining module 810 and a first transmitting module 820.

The first determining module 810 is configured to, in response to receiving target indication information that is configured to indicate an occurrence of a paging collision and reported by the target SIM card, determine target configuration information, where the target configuration information is new configuration information related to a paging process of the target SIM card.

The first transmitting module 820 is configured to transmit the target configuration information to the target SIM card.

Referring to FIG. 12, FIG. 12 is a block diagram of an apparatus for information transmission 900 according to an embodiment. The apparatus 900 is applied to an anchor base station corresponding to a target SIM card of a multi-card terminal in an inactive state, and includes a second determining module 910 and a second transmitting module 920.

The second determining module 910 is configured to, in response to receiving target indication information indicating an occurrence of a paging collision, determine target configuration information, where the target configuration information is new configuration information related to a paging process of the target SIM card.

The second transmitting module 920 is configured to transmit the target configuration information to a designated device.

Referring to FIG. 13, FIG. 13 is a block diagram of an apparatus for information transmission 1000 according to an embodiment. The apparatus 1000 is applied to a core network device and includes a third determining module 1010 and a third transmitting module 1020.

The third determining module 1010 is configured to in response to receiving target indication information that is configured to indicate an occurrence of a paging collision and transmitted by an anchor base station corresponding to a target SIM card of a multi-card terminal in an inactive state, determine target configuration information, where the target configuration information is new configuration information related to a paging process of the target SIM card.

The third transmitting module 1020 is configured to transmit the target configuration information to the anchor base station.

Since the apparatus embodiments correspond to the method embodiments, the relevant parts can refer to the partial description of the method embodiments. The apparatus examples described above are merely illustrative, where the units described as separate components may or may not be physically separated, and the components displayed as units may or may not be physical units, i.e., may be located in one place or may be distributed to multiple network units. Some or all of the modules can be selected according to the actual needs to achieve the purpose of the technical solutions of the present disclosure. A person skilled in the art can understand and implement without creative work.

Correspondingly, in the present disclosure, a computer-readable storage medium is further provided, which stores a computer program for executing any of the methods for information transmission performed by the multi-card terminal side described above.

Correspondingly, in the present disclosure, a computer-readable storage medium is further provided, which stores a computer program for executing any of the methods for information transmission performed by the base station side described above. The base station side can refer to an anchor base station or a target base station, and the anchor base station and the target base station can be the same base station or different base stations.

Correspondingly, in the present disclosure, a computer-readable storage medium is further provided, which stores a computer program for executing any of the methods for information transmission performed by the core network device side described above.

Correspondingly, in the present disclosure, an apparatus for information transmission is further provided, and includes: a processor; a memory for storing instructions executable by the processor. The processor is configured to execute any of the methods for information transmission performed by the multi-card terminal side.

Figure 14:
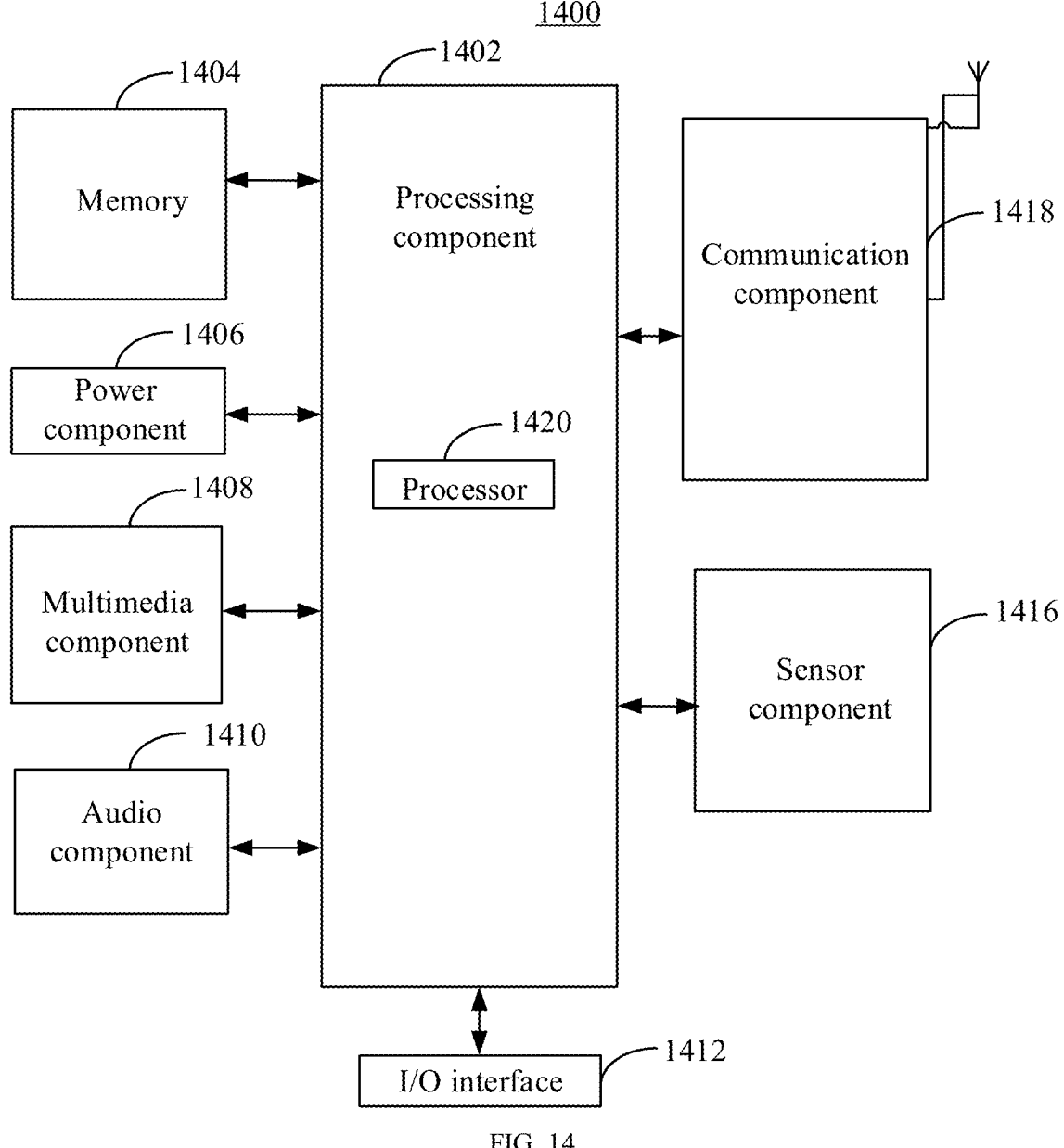
FIG. 14 is a schematic structural diagram of an apparatus for information transmission according to an embodiment.

FIG. 14 is a schematic structural diagram illustrating an electronic device 1400 according to an example of the present disclosure. For example, the electronic device 1400 can be a mobile phone, tablet, e-book reader, multimedia playback device, wearable device, car terminal, iPad, smart TV, or other multi-card terminals including multiple SIM cards.

Referring to FIG. 14, the electronic device 1400 may include one or more of the following components: a processing component 1402, a memory 1404, a power component 1406, a multimedia component 1408, an audio component 1410, an input/output (I/O) interface 1412, a sensor component 1416, and a communication component 1418.

The processing assembly 1402 generally controls the overall operation of the electronic device 1400, such as operations associated with displays, phone calls, data information transmissions, camera operations, and recording operations. The processing assembly 1402 may include one or more processors 1420 to execute instructions to complete all or a part of the steps of the above methods for information transmission. Further, the processing component 1402 may include one or more modules to facilitate interaction between the processing component 1402 and another component. For example, the processing component 1402 may include a multimedia module to facilitate the interaction between the multimedia component 1408 and the processing component 1402. For another example, the processing component 1402 may read executable instructions from the memory to perform steps in the method for information transmission provided in the embodiments as described above.

The memory 1404 is configured to store different types of data to support operation at the electronic device 1400. Examples of such data include instructions, contact data, phonebook data, messages, pictures, videos, and so on for any application or method that operates on the electronic device 1400. The memory 1404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power source assembly 1406 provides power to different assemblies of the electronic device 1400. The power source assembly 1406 may include a power source management system, one or more power sources, and other assemblies associated with generating, managing, and distributing power for the electronic device 1400.

The multimedia component 1408 includes a display screen that provides an output interface between the electronic device 1400 and a user. In some examples, the multimedia component 1408 may include a front camera and/or a rear camera. When the electronic device 1400 is in an operating mode, such as in a shooting mode or a video mode, the front camera and/or the rear camera may receive external multimedia data. Each of the front camera and the rear camera may be a fixed optical lens system or be of a focal length and capability of an optical zoom.

The audio component 1410 is configured to output and/or input an audio signal. For example, the audio assembly 1410 includes a microphone (MIC). When the electronic device 1400 is in an operating mode, for example, in a call mode, a recording mode, or a speech recognition mode, the microphone is configured to receive an external audio signal. The received audio signal may be further stored in the memory 1404 or transmitted via the communication component 1418. In some examples, the audio component 1410 also includes a loudspeaker for outputting an audio signal.

The I/O interface 1412 may provide an interface between the processing component 1402 and peripheral interface modules. The above peripheral interface modules may include a keyboard, a click wheel, buttons, and so on. These buttons may include, but are not limited to, a home button, a volume button, a start button, and a lock button.

The sensor assembly 1416 includes one or more sensors for evaluating states of the electronic device 1400 in different aspects. For example, the sensor component 1416 may detect the on/off status of the electronic device 1400, and the relative positioning of the component, for example, the component is a display and a keypad of the electronic device 1400. The sensor component 1416 may also detect a change in position of the electronic device 1400 or a component of the electronic device 1400, the presence or absence of contact between a user and the electronic device 1400, an orientation or an acceleration/deceleration of the electronic device 1400, and a change in temperature of the electronic device 1400. The sensor component 1416 may include a proximity sensor for detecting the existence of a nearby object without any physical touch. The sensor component 1416 may also include an optical sensor, such as a CMOS or CCD image sensor used in an imaging application. In some examples, the sensor component 1416 may also include an acceleration sensor, a gyro sensor, a magnetic sensor, a pressure sensor, or a temperature sensor.

The communication assembly 1418 is configured to facilitate wired or wireless information transmission between the electronic device 1400 and other devices. The electronic device 1400 can access wireless networks based on information transmission standards, such as Wi-Fi, 2G, 3G, 4G, 5G, 6G, or a combination of them. In some embodiments, the communication component 1418 may receive a broadcast signal or broadcast-related information from an external broadcast management system via a broadcast channel. In an example, the communication component 1418 may also include a Near Field information transmission (NFC) module to facilitate short-range information transmission. For example, the NFC module may be implemented based on a radio frequency identification (RFID) technology, an infrared data association (IrDA) technology, an ultra wide band (UWB) technology, a Bluetooth (BT) technology, and other technologies.

In some illustrative embodiments, the electronic device 1400 may be implemented by one or more of an application-specific integrated circuit (ASIC), a digital signal processor (DSP), a digital signal processing device (DSPD), programmable logical device (PLD), field programmable gate array (FPGA), a controller, microcontroller, a microprocessor or other electronic components to execute the above methods for information transmission.

In an example embodiment, there is also provided a non-transitory machine-readable storage medium including instructions, such as a memory 1404 including instructions, where the instructions are executable by the processor 1420 of the electronic device 1400 to implement the method of controlling temperature as described above. For example, the non-transitory computer-readable storage medium may be a Read-Only Memory (ROM), a Random Access Memory (RAM), a CD-ROM, a magnetic tape, a floppy disk, an optical data storage device, etc.

Correspondingly, in the present disclosure, an apparatus for information transmission is further provided, and includes: a processor; and a memory for storing instructions executable by the processor. The processor is configured to execute any of the methods for information transmission performed by the base station side.

Figure 15:
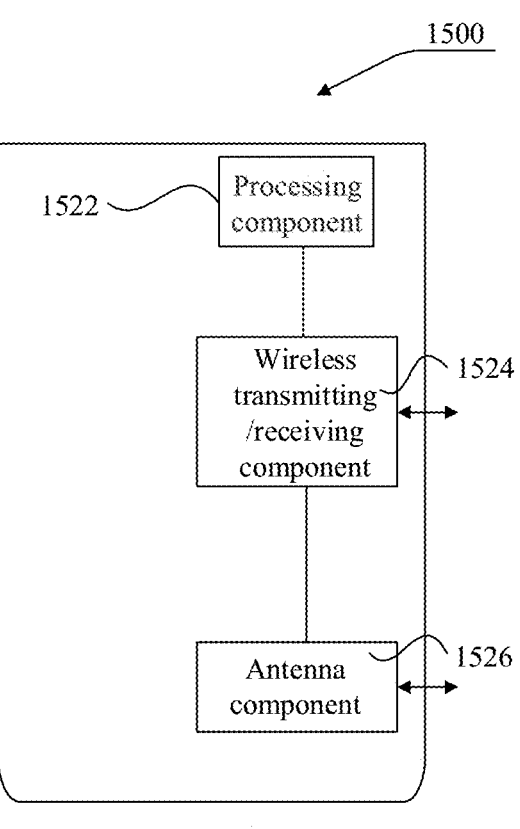
FIG. 15 is a schematic structural diagram of an apparatus for information transmission according to an embodiment.

As shown in FIG. 15, FIG. 15 is a schematic structural diagram of an apparatus 1500 for information transmission according to an embodiment. The apparatus 1500 may be provided as a base station. Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors.

One of the processors in the processing component 1522 may be configured to execute any one of the foregoing methods for information transmission performed by the base station side.

Correspondingly, in the present disclosure, an apparatus for information transmission is further provided, and includes: a processor; and a memory for storing instructions executable by the processor. The processor is configured to execute any of the methods for information transmission performed by the core network device side.

Figure 16:
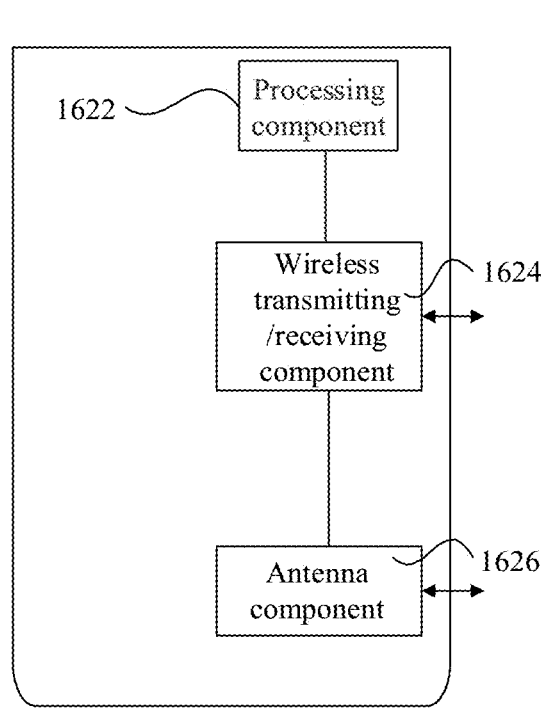
FIG. 16 is a schematic structural diagram of an apparatus for information transmission according to an embodiment.

As shown in FIG. 16, FIG. 16 is a schematic structural diagram of an apparatus 1600 for information transmission according to an embodiment. The apparatus 1600 may be provided as a core network device. Referring to FIG. 16, the apparatus 1600 includes a processing component 1622, a wireless transmitting/receiving component 1624, an antenna component 1626, and a signal processing portion specific to a wireless interface. The processing component 1622 may further include one or more processors.

One of the processors in the processing component 1622 may be configured to execute any one of the foregoing methods for information transmission performed by the core network device side.

In some embodiments, a method for information transmission is provided, performed by a multi-card terminal, and comprises: in response to determining an occurrence of a paging collision, reporting, by a target SIM card in an inactive state, target indication information configured to indicate the occurrence of a paging collision to a target base station, wherein the target base station is a base station where the target SIM card resides.

In some embodiments, reporting, by the target SIM card in the inactive state, the target indication information configured to indicate the occurrence of a paging collision to the target base station comprises: reporting, by the target SIM card, a reserved preamble configured to indicate the occurrence of a paging collision to the target base station.

In some embodiments, the method further comprises: reporting, by the target SIM card, SIM card identification information of the target SIM card to the target base station.

In some embodiments, the method further comprises: receiving the reserved preamble configured by the target base station for the target SIM card; or determining the reserved preamble according to a predefined setting.

In some embodiments, reporting, by the target SIM card in the inactive state, the target indication information configured to indicate the occurrence of a paging collision to the target base station comprises: reporting, by the target SIM card, the target indication information to the target base station through a target RRC signalling.

In some embodiments, reporting, by the target SIM card, the target indication information to the target base station through the target RRC signalling comprises: adding the target indication information to a first information element in the target RRC signalling, and reporting the target RRC signalling to the target base station; or adding a second information element corresponding to the target indication information into the target RRC signalling, and reporting the target RRC signalling to the target base station.

In some embodiments, the method further comprises: receiving target configuration information transmitted by the target base station, wherein the target configuration information is new configuration information related to a paging process of the target SIM card; and monitoring and receiving, by the target SIM card, paging signalling according to the target configuration information.

In some embodiments, the method further comprises: reporting, by the target SIM card, target assistance information to the target base station, wherein the target assistance information is configured to assist the network side in determining the target configuration information.

In some embodiments, the target configuration information comprises at least one of: a new temporary SIM card identification information of the target SIM card, an offset value of the temporary SIM card identification information of the target SIM card, an offset value of paging timing corresponding to the target SIM card or new gap pattern configuration information corresponding to the target SIM card; and monitoring and receiving, by the target SIM card, the paging signalling according to the target configuration information comprises: determining, by the target SIM card, updated paging timing according to the target configuration information; and monitoring and receiving, by the target SIM card, the paging signalling at the updated paging timing.

In some embodiments, a method for information transmission is provided, performed by a target base station where a target SIM card of a multi-card terminal in an inactive state resides, and comprises: in response to receiving target indication information reported by the target SIM card to indicate an occurrence of a paging collision, determining target configuration information, wherein the target configuration information is new configuration information related to a paging process of the target SIM card; and transmitting the target configuration information to the target SIM card.

In some embodiments, determining the target configuration information comprises: according to target assistance information and/or pre-stored paging configuration information related to a paging process corresponding to at least one SIM card of the multi-card terminal, configuring the target configuration information for the target SIM card, wherein the target assistance information is reported by the target SIM card for assisting a network side in determining the target configuration information.

In some embodiments, determining the target configuration information comprises: transmitting the target indication information to a designated network device; and obtaining the target configuration information transmitted by the designated network device.

In some embodiments, transmitting the target indication information to the designated network device comprises: transmitting the target indication information to the designated network device; or transmitting the target indication information and target assistance information to the designated network device, wherein the target assistance information is reported by the target SIM card for assisting the network side in determining the target configuration information.

In some embodiments, the target base station and an anchor base station corresponding to the target SIM card are different base stations, and the designated network device comprises the anchor base station; or the target base station and an anchor base station corresponding to the target SIM card are the same base station, and the designated network device comprises a core network device.

In some embodiments, the target base station and the anchor base station corresponding to the target SIM card are different base stations, and the designated network device comprises the anchor base station, and transmitting the target indication information to the anchor base station comprises: transmitting the target indication information to the anchor base station through first signalling.

In some embodiments, transmitting the target indication information to the anchor base station through the first signalling comprises: adding the target indication information to a third information element of the first signalling, and transmitting the first signalling to the anchor base station; or adding a fourth information element corresponding to the target indication information into the first signalling, and transmitting the first signalling to the anchor base station.

In some embodiments, transmitting the target configuration information to the target SIM card comprises: transmitting the target configuration information to the target SIM card through unicast RRC signalling.

In some embodiments, the target configuration information comprises at least one of: a new temporary SIM card identification information of the target SIM card, an offset value of the temporary SIM card identification information of the target SIM card, an offset value of paging timing corresponding to the target SIM card, or new gap pattern configuration information corresponding to the target SIM card.

In some embodiments, the target indication information comprises a reserved preamble, and before receiving the target indication information reported by the target SIM card to indicate the occurrence of a paging collision, the method further comprises: configuring the reserved preamble for the target SIM card, and transmitting the configured reserved preamble to the target SIM card.

In some embodiments, a method for information transmission is provided, performed by an anchor base station corresponding to a target SIM card of a multi-card terminal in an inactive state, and comprises: in response to receiving target indication information to indicate an occurrence of a paging collision, determining target configuration information, wherein the target configuration information is new configuration information related to a paging process of the target SIM card; and transmitting the target configuration information to a designated device.

In some embodiments, receiving the target indication information configured to indicate the occurrence of a paging collision comprises: receiving the target indication information reported by the target SIM card, wherein the designated device comprises the target SIM card.

In some embodiments, receiving the target indication information to indicate the occurrence of a paging collision comprises: receiving the target indication information transmitted by the target base station, wherein the target base station is a base station where the target SIM card resides; and the designated device comprises the target base station.

In some embodiments, determining the target configuration information comprises: according to target assistance information and/or pre-stored paging configuration information related to a paging process corresponding to at least one SIM card of the multi-card terminal, configuring the target configuration information for the target SIM card, wherein the target assistance information is reported by the target SIM card for assisting a network side in determining the target configuration information.

In some embodiments, determining the target configuration information comprises: transmitting the target indication information to a core network device; and obtaining the target configuration information transmitted by the core network device.

In some embodiments, transmitting the target indication information to the core network device comprises: transmitting the target indication information to the core network device; or transmitting the target indication information and target assistance information to the core network device, wherein the target assistance information is reported by the target SIM card for assisting the network side in determining the target configuration information.

In some embodiments, transmitting the target configuration information to the target SIM card comprises: transmitting the target configuration information to the target SIM card through unicast RRC signalling.

In some embodiments, transmitting the target configuration information to the target base station comprises: transmitting the target configuration information to the target base station through second signalling.

In some embodiments, transmitting the target configuration information to the target base station through the second signalling comprises: adding the target configuration information to a fifth information element in the second signalling, and transmitting the second signalling to the target base station; or adding a sixth information element corresponding to the target configuration information into the second signalling, and transmitting the second signalling to the target base station.

In some embodiments, the target configuration information comprises at least one of: a new temporary SIM card identification information of the target SIM card, an offset value of the temporary SIM card identification information of the target SIM card, an offset value of paging timing corresponding to the target SIM card, or new gap pattern configuration information corresponding to the target SIM card.

In some embodiments, a method for information transmission is provided, performed by a core network device, and comprises: in response to receiving target indication information that is configured to indicate an occurrence of a paging collision and transmitted by an anchor base station corresponding to a target SIM card of a multi-card terminal in an inactive state, determining target configuration information, wherein the target configuration information is new configuration information related to a paging process of the target SIM card; and transmitting the target configuration information to the anchor base station.

In some embodiments, determining the target configuration information comprises: according to target assistance information and/or pre-stored paging configuration information related to a paging process corresponding to at least one SIM card of the multi-card terminal, configuring the target configuration information for the target SIM card, wherein the target assistance information is reported by the target SIM card for assisting a network side in determining the target configuration information.

In some embodiments, the target configuration information comprises at least one of: a new temporary SIM card identification information of the target SIM card, an offset value of the temporary SIM card identification information of the target SIM card, an offset value of paging timing corresponding to the target SIM card, or new gap pattern configuration information corresponding to the target SIM card.

In some embodiments, an apparatus for information transmission is provided, applied to a multi-card terminal, and comprises: a reporting module, configured to, in response to determining the occurrence of a paging collision, report, by a target SIM card in an inactive state, target indication information configured to indicate the occurrence of a paging collision to a target base station, wherein the target base station is a base station where the target SIM card resides.

In some embodiments, an apparatus for information transmission is provided, applied to a target base station where a target SIM card of a multi-card terminal in an inactive state resides, and comprises: a first determining module, configured to, in response to receiving target indication information reported by the target SIM card to indicate the occurrence of a paging collision, determine target configuration information, wherein the target configuration information is new configuration information related to a paging process of the target SIM card; and a first transmitting module, configured to transmit the target configuration information to the target SIM card.

In some embodiments, an apparatus for information transmission is provided, applied to an anchor base station corresponding to a target SIM card of a multi-card terminal in an inactive state, and comprises: a second determining module, configured to, in response to receiving target indication information to indicate the occurrence of a paging collision, determine target configuration information, wherein the target configuration information is new configuration information related to a paging process of the target SIM card; and a second transmitting module, configured to transmit the target configuration information to a designated device.

In some embodiments, an apparatus for information transmission is provided, applied to a core network device, and comprises: a third determining module, configured to, in response to receiving target indication information that is configured to indicate the occurrence of a paging collision and transmitted by an anchor base station corresponding to a target SIM card of a multi-card terminal in an inactive state, determine target configuration information, wherein the target configuration information is new configuration information related to a paging process of the target SIM card; and a third transmitting module, configured to transmit the target configuration information to the anchor base station.

In some embodiments, a computer-readable storage medium storing a computer program is provided, wherein the computer program is configured to execute the above method for information transmission performed by a multi-card terminal.

In some embodiments, a computer-readable storage medium storing a computer program is provided, wherein the computer program is configured to execute the above method for information transmission performed by a target base station where a target SIM card of a multi-card terminal in an inactive state resides or an anchor base station corresponding to a target SIM card of a multi-card terminal in an inactive state.

In some embodiments, a computer-readable storage medium storing a computer program is provided, wherein the computer program is configured to execute the above method for information transmission performed by a core network device.

In some embodiments, an apparatus for information transmission is provided, and comprises: a processor; and a memory for storing instructions executable by the processor; wherein the processor is configured to perform the above method for information transmission performed by a multi-card terminal.

In some embodiments, an apparatus for information transmission is provided, and comprises: a processor; and a memory for storing instructions executable by the processor;

wherein the processor is configured to perform the above method for information transmission performed by a target base station where a target SIM card of a multi-card terminal in an inactive state resides or an anchor base station corresponding to a target SIM card of a multi-card terminal in an inactive state.

In some embodiments, an apparatus for information transmission is provided, and comprises: a processor; and a memory for storing instructions executable by the processor; wherein the processor is configured to perform the above method for information transmission performed by a core network device.

The technical solutions provided by embodiments of the present disclosure may include the following beneficial effects.

In the embodiments of the present disclosure, in response to determining the occurrence of a paging collision, a multi-card terminal can transmit target indication information configured to indicate the occurrence of a paging collision to the target base station through the target SIM card in the inactive state, and inform the network side of the occurrence of a paging collision of the multi-card terminal through the target indication information. The network side can solve the paging collision problem based on the target indication information. In the present disclosure, the target indication information reported by the target SIM card of the multi-card terminal in the inactive state can be used to solve the paging collision problem for the multi-card terminal and ensure the normal operation of the multi-card terminal services.

In the embodiments of the present disclosure, the target SIM card can transmit a reserved preamble as target indication information to the target base station, and at the same time, the target SIM card can further transmit the SIM card identification information of the target SIM card to the target base station, so that the target base station can transmit the target configuration information to the target SIM card after determining the target configuration information based on the reserved preamble and SIM card identification information, which is easy to achieve and has high availability.

In the embodiments of the present disclosure, the target SIM card can report target indication information to the target base station through target RRC signaling, which is easy to achieve and has high availability.

In the embodiments of the present disclosure, in addition to reporting target indication information, the target SIM card can further report target assistance information to the target base station, where the target assistance information is configured to assist a network side in determining the target configuration information. The network side can determine target configuration information for the target SIM card based on the target indication information and, combined with target assistance information, to solve the problem of paging collision on the multi-card terminal, which has high availability.

In the embodiments of the present disclosure, the target base station can configure a reserved preamble as the target indication information for the target SIM card, or the reserved preamble as the target indication information can be pre-agreed in the protocol, which has high availability.

In the embodiments of the present disclosure, the target base station where the target SIM card resides, the anchor base station corresponding to the target SIM card, or the core network device can all configure the target configuration information for the target SIM card, to solve the problem of paging collision on the multi-card terminal, which ensures the normal operation of the multi-card terminal services.

Other implementations of the present disclosure will be apparent to those skilled in the art from consideration of the specification and practice of the present disclosure herein. The present application is intended to cover any variations, uses, or adaptations of the present disclosure, which follow the general principle of the present disclosure and include common knowledge or conventional technical means in the art that are not disclosed in the present disclosure. The specification and embodiments herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The invention claimed is:

1. A method for information transmission, performed by a multi-card terminal configured with a target SIM card in an RRC_INACTIVE state, comprising:
  determining an occurrence of a paging collision;
  sending, via the target SIM card, target indication information configured to indicate the occurrence of the paging collision to a target base station, wherein the target base station is a base station where the target SIM card resides; and
  receiving target configuration information, wherein the target configuration information is configured by the target base station or an anchor base station corresponding to the target SIM card;
  wherein sending, via the target SIM card, the target indication information configured to indicate the occurrence of the paging collision to the target base station comprises:
    sending, via the target SIM card, a reserved preamble configured to indicate the occurrence of the paging collision to the target base station; or
    sending, via the target SIM card, a reserved preamble configured to indicate the occurrence of the paging collision to the target base station, and SIM card identification information of the target SIM card to the target base station.

2. The method according to claim 1, further comprising:
  receiving the reserved preamble configured by the target base station for the target SIM card; or
  determining the reserved preamble according to a predefined setting.

3. The method according to claim 1, wherein
  sending, via the target SIM card, the target indication information configured to indicate the occurrence of the paging collision to the target base station comprises:
    sending, via the target SIM card, the target indication information to the target base station through a target RRC signaling;
    sending, via the target SIM card, the target indication information to the target base station through the target RRC signaling comprises:
      adding the target indication information to a first information element in the target RRC signaling, and sending the target RRC signaling to the target base station; or
      adding a second information element corresponding to the target indication information into the target RRC signaling, and sending the target RRC signaling to the target base station.

4. The method according to claim 1, wherein
  the target configuration information is transmitted by the target base station, wherein the target configuration information is new configuration information related to a paging process of the target SIM card, and the target configuration information comprises at least one of: a new temporary SIM card identification information of the target SIM card, an offset value of the temporary SIM card identification information of the target SIM card, an offset value of paging timing corresponding to the target SIM card, or new gap pattern configuration information corresponding to the target SIM card; and
  the method further comprises:
    monitoring and receiving, via the target SIM card, paging signaling according to the target configuration information;
    wherein monitoring and receiving, via the target SIM card, the paging signaling according to the target configuration information comprises:
      determining, via the target SIM card, updated paging timing according to the target configuration information; and
      monitoring and receiving, via the target SIM card, the paging signaling at the updated paging timing.

5. The method according to claim 4, further comprising:
  sending, via the target SIM card, target assistance information to the target base station, wherein the target assistance information is configured to assist a network side in determining the target configuration information.

6. An apparatus for information transmission, comprising:
  a processor; and
  a memory for storing instructions executable by the processor;
  wherein the processor is configured to perform the method for information transmission according to claim 1.

7. A method for information transmission, performed by a base station, comprising:
  receiving target indication information configured to indicate an occurrence of a paging collision associated with a target SIM card;
  determining target configuration information, wherein the target configuration information is new configuration information related to a paging process of the target SIM card of a multi-card terminal in an RRC_INACTIVE state, wherein the target configuration information is configured by the target base station or an anchor base station corresponding to the target SIM card; and
  transmitting the target configuration information;
  wherein the target indication information comprises a reserved preamble; and
  the method further comprises:
    determining that the reserved preamble is configured for the target SIM card; and
    transmitting the configured reserved preamble to the target SIM card.

8. The method according to claim 7, wherein determining the target configuration information comprises:
  according to target assistance information and/or pre-stored paging configuration information related to a paging process corresponding to at least one SIM card of the multi-card terminal, configuring the target configuration information for the target SIM card, wherein the target assistance information is transmitted by the target SIM card of the multi-card terminal for assisting a network side in determining the target configuration information, and the target configuration information comprises at least one of: a new temporary SIM card identification information of the target SIM card, an offset value of the temporary SIM card identification information of the target SIM card, an offset value of paging timing corresponding to the target SIM card, or new gap pattern configuration information corresponding to the target SIM card.

9. The method according to claim 7, wherein determining the target configuration information comprises:

transmitting the target indication information to a designated network device; and obtaining the target configuration information transmitted from the designated network device; and transmitting the target indication information to the designated network device comprises:

transmitting the target indication information to the designated network device; or transmitting the target indication information and the target assistance information to the designated network device, wherein the target assistance information is transmitted by the target SIM card of the multi-card terminal for assisting a network side in determining the target configuration information.

10. The method according to claim 9, wherein the base station comprises a target base station where the target SIM card resides or an anchor base station corresponding to the target SIM card, wherein the target base station and the anchor base station are a same base station, and the designated network device comprises a core network device; and the method further comprises:

receiving the target indication information sent from the target SIM card of the multi-card terminal;

sending the target indication information to the core network device;

receiving the target configuration information from the core network device; and sending the target configuration information to the target SIM card of the multi-card terminal.

11. The method according to claim 9, wherein the base station comprises a target base station where the target SIM card resides, the target base station and an anchor base station corresponding to the target SIM card are different base stations, and the designated network device comprises the anchor base station; and the method further comprises:

receiving, by the target base station, the target indication information from the target SIM card of the multi-card terminal;

sending, by the target base station, the target indication information to the anchor base station;

receiving, by the target base station, the target configuration information from the anchor base station; and sending, by the target base station, the target configuration information to the target SIM card of the multi-card terminal;

wherein sending, by the target base station, the target configuration information to the target SIM card of the multi-card terminal comprises:

sending, by the target base station, the target configuration information to the target SIM card of the multi-card terminal through unicast RRC signaling.

12. The method according to claim 9, wherein the base station comprises an anchor base station corresponding to the target SIM card, the anchor base station and the target base station where the target SIM card resides are different base stations, and the designated network device comprises the core network device; and the method further comprises:

receiving, by the anchor base station, the target indication information from the target base station;

sending, by the anchor base station, the target indication information to the core network device;

receiving, by the anchor base station, the target configuration information from the core network device; and sending, by the anchor base station, the target configuration information to the target base station.

13. The method according to claim 11, wherein sending, by the target base station, the target indication information to the anchor base station comprises:

sending, by the target base station, the target indication information to the anchor base station through first signaling;

wherein sending, by the target base station, the target indication information to the anchor base station through the first signaling comprises:

determining that the target indication information is added to a third information element in the first signaling, and sending, by the target base station, the first signaling to the anchor base station; or determining that a fourth information element corresponding to the target indication information is added to the first signaling, and sending, by the target base station, the first signaling to the anchor base station.

14. The method according to claim 12, wherein sending, by the anchor base station, the target configuration information to the target base station comprises:

sending, by the anchor base station, the target configuration information to the target base station through second signaling; and wherein sending, by the anchor base station, the target configuration information to the target base station through the second signaling comprises:

determining that the target configuration information is added to a fifth information element in the second signaling, and sending, by the anchor base station, the second signaling to the target base station; or determining that a sixth information element corresponding to the target configuration information is added to the second signaling, and sending, by the anchor base station, the second signaling to the target base station.

15. An apparatus for information transmission, comprising:

a processor; and a memory for storing instructions executable by the processor;

wherein the processor is configured to perform the method for information transmission according to claim 7.

16. A method for information transmission, performed by a core network device, comprising:

receiving target indication information that is configured to indicate an occurrence of a paging collision and transmitted by an anchor base station corresponding to a target SIM card of a multi-card terminal in an RRC_INACTIVE state;

determining target configuration information, wherein the target configuration information is new configuration information related to a paging process of the target SIM card; and transmitting the target configuration information to the anchor base station;

wherein the target indication information comprises a reserved preamble; and the method further comprises:

determining that the reserved preamble is configured for the target SIM card; and transmitting the configured reserved preamble to the target SIM card.

17. The method according to claim 16, wherein determining the target configuration information comprises:

according to target assistance information and/or pre-stored paging configuration information related to a paging process corresponding to at least one SIM card of the multi-card terminal, configuring the target configuration information for the target SIM card, wherein the target assistance information is transmitted by the multi-card terminal via the target SIM card for assisting a network side in determining the target configuration information, and the target configuration information comprises at least one of: a new temporary SIM card identification information of the target SIM card, an offset value of the temporary SIM card identification information of the target SIM card, an offset value of paging timing corresponding to the target SIM card, or new gap pattern configuration information corresponding to the target SIM card.

18. An apparatus for information transmission, comprising:

a processor; and a memory for storing instructions executable by the processor;

wherein the processor is configured to perform the method for information transmission according to claim 16.

\* \* \* \* \*